(12) United States Patent
Rammer

(10) Patent No.: US 7,258,191 B1
(45) Date of Patent: Aug. 21, 2007

(54) AIR BAG SYSTEM INCORPORATED INTO MOTOR VEHICLE BUMPER

(76) Inventor: David R Rammer, 2109-B Indiana Ave., Sheboygan, WI (US) 53081

( * ) Notice: Subject to any disclaimer, the term of this patent is extended or adjusted under 35 U.S.C. 154(b) by 73 days.

(21) Appl. No.: 11/084,909

(22) Filed: Mar. 21, 2005

(51) Int. Cl.
*B60K 28/10* (2006.01)
(52) U.S. Cl. ..................................... 180/274
(58) Field of Classification Search ............... 180/274, 180/271, 282; 296/194, 203.1, 198, 205
See application file for complete search history.

(56) References Cited

U.S. PATENT DOCUMENTS 4,518,183 A * 5/1985 Lee .............................. 293/118

FOREIGN PATENT DOCUMENTS

JP          2002002422 A  *  1/2002

* cited by examiner

*Primary Examiner*—Faye M. Fleming
(74) *Attorney, Agent, or Firm*—Michael I. Kroll

(57) ABSTRACT

An air bag safety system for motor vehicles comprising at least one bumper designed to house a plurality of airbags within blow away compartments that allow for the individual air bags to be deployed. Further comprising said invention are a plurality of pressure sensors as actuating means for discharging the gas cartridges, which are further coupled to the air bags of said invention.

6 Claims, 12 Drawing Sheets

AIR BAG SYSTEM INCORPORATED INTO MOTOR VEHICLE BUMPER

BACKGROUND OF THE INVENTION

Field of the Invention

The present invention relates generally to motor vehicles and more specifically, to collision safety equipment for motor vehicles encompassing the incorporation of a plurality of air bags into the body of the vehicle that will automatically deploy under impact by predetermined pressure. Preferably, the bags are situated in or near the front and rear bumper with the intent of absorbing some of the force encountered in a collision with static or dynamic objects.

The present invention further relates, to an air bag system incorporated into a vehicle's bumper having gas cartridges that are actuated by pressure sensors housed within the bumper, that are triggered when the vehicle is in a collision that exceeds a set velocity. The gas cartridges are designed as not to explode upon vehicle collision, but to respond to the pressure sensors that gauge the impact and trigger said gas cartridges. The gas cartridges further release their pressurized load into the plurality of air bags that they are associated with, thus preventing extensive harm or injury to the operator of the vehicle.

The present invention comprises a bumper designed to house a plurality of airbags within blow away compartments that allow for the individual air bags to be deployed. Further comprising said invention are a plurality of pressure sensors as actuating means for discharging the gas cartridges, which are further coupled to the air bags of said invention. The bumper is then affixed by fastening means to the front and rear of the intended vehicle of use.

The present invention ensures that all aspects of a collision are covered by placing a plurality of pressure sensors equidistantly positioned within the bumper housing. As well as absorbing the effects of a collision the bumper airbags may also assist in deflecting all unwanted energy of the collision.

The present invention is robust in the nature in the means that it may be affixed to any vehicle make or size and perform with the same accuracy at all times.

Presently there are, air bag systems incorporated into a vehicle's interior to absorb forces imparted to the vehicle's occupants through inertia of the vehicle.

These systems have proven to be very successful in dissipating occupant inertia during collision, but have not addressed vehicle inertia other than incorporating collapsible components.

Therefore, it is felt that a need exists for additional means of dissipating inertial forces during vehicular impact by incorporating deployable airbags within a motor vehicle's exterior, specially the front and/or rear bumpers.

SUMMARY OF THE PRESENT INVENTION

A primary object of the present invention is to provide an air bag deployment system for motor vehicles incorporated into one or more bumper.

Another object of the present invention is to provide an air bag deployment system having a plurality of air bags arranged within a front and/or rear bumper.

Yet another object of the present invention is to provide an air bag deployment system having a bumper with a plurality of designated sections that break away upon deployment of the airbags.

Still yet another object of the present invention is to provide an air bag deployment system having a plurality of pressurized gas filled cartridges Yet another object of the present invention is to provide an air bag deployment system having a plurality of pressure sensors in communication with the pressurized gas cartridges.

Another object of the present invention is to provide an air bag deployment system that upon a predetermined pressure applied to any portion of a bumper incorporating said pressure sensors, causes said sensors to trigger the release of the gas into one or more airbags that deploy through one or more of the bumper's break away sections thereby absorbing some portion of the bumper.

Another object of the present invention is to provide an air bag deployment system that can be affixed to any standard motor vehicle.

The present invention overcomes the shortcomings of the prior art by providing an air bag deployment system incorporated within a vehicles bumpers.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
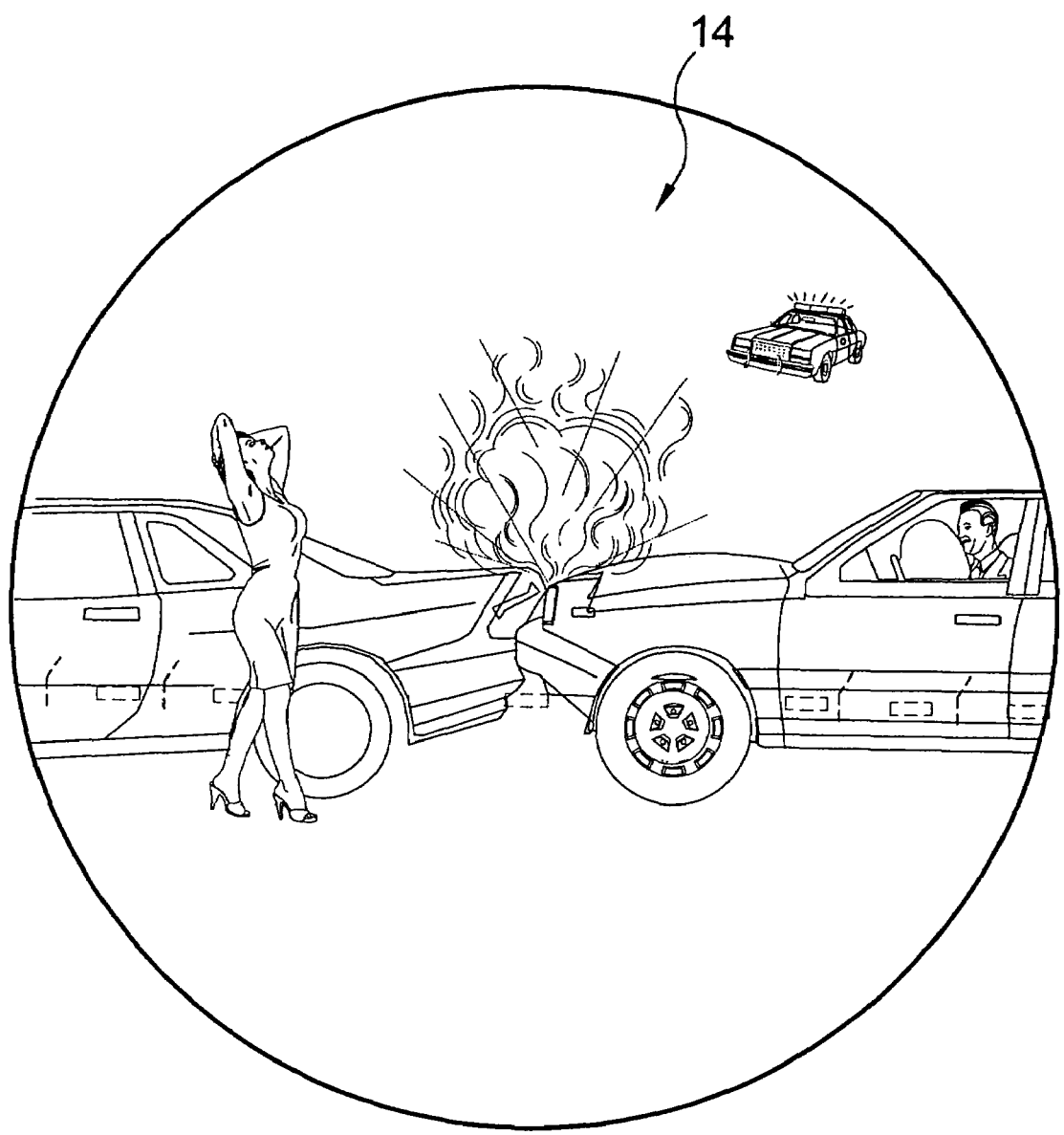
FIG. 1 is an illustrative view of the prior art.

Turning now descriptively to the drawings, in which similar reference characters denote similar elements throughout the several view, the figures illustrate the Air bag system for motor vehicle bumpers of the present invention. With regard to the reference numerals used, the following numbering is used throughout the various drawing figures.

10 Air bag system for motor vehicle bumpers
12 auto
14 prior art
16 front bumper
18 rear bumper
20 air bag
22 air bag compartment
24 breakaway panel
26 pressure sensor
28 sensor signal
30 gas cartridge
32 vehicle 1
34 vehicle 2
36 vehicle 3

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the prior art 14. Vehicle collisions can be costly, cause injury and increase insurance costs. The present invention overcomes front and rear collision damage by providing an air bag system comprising an air bag compartment, housing said air bag, integrally incorporated within a vehicle bumper having pressure sensor (sensors) in communication with a gas cartridge.

Figure 2:
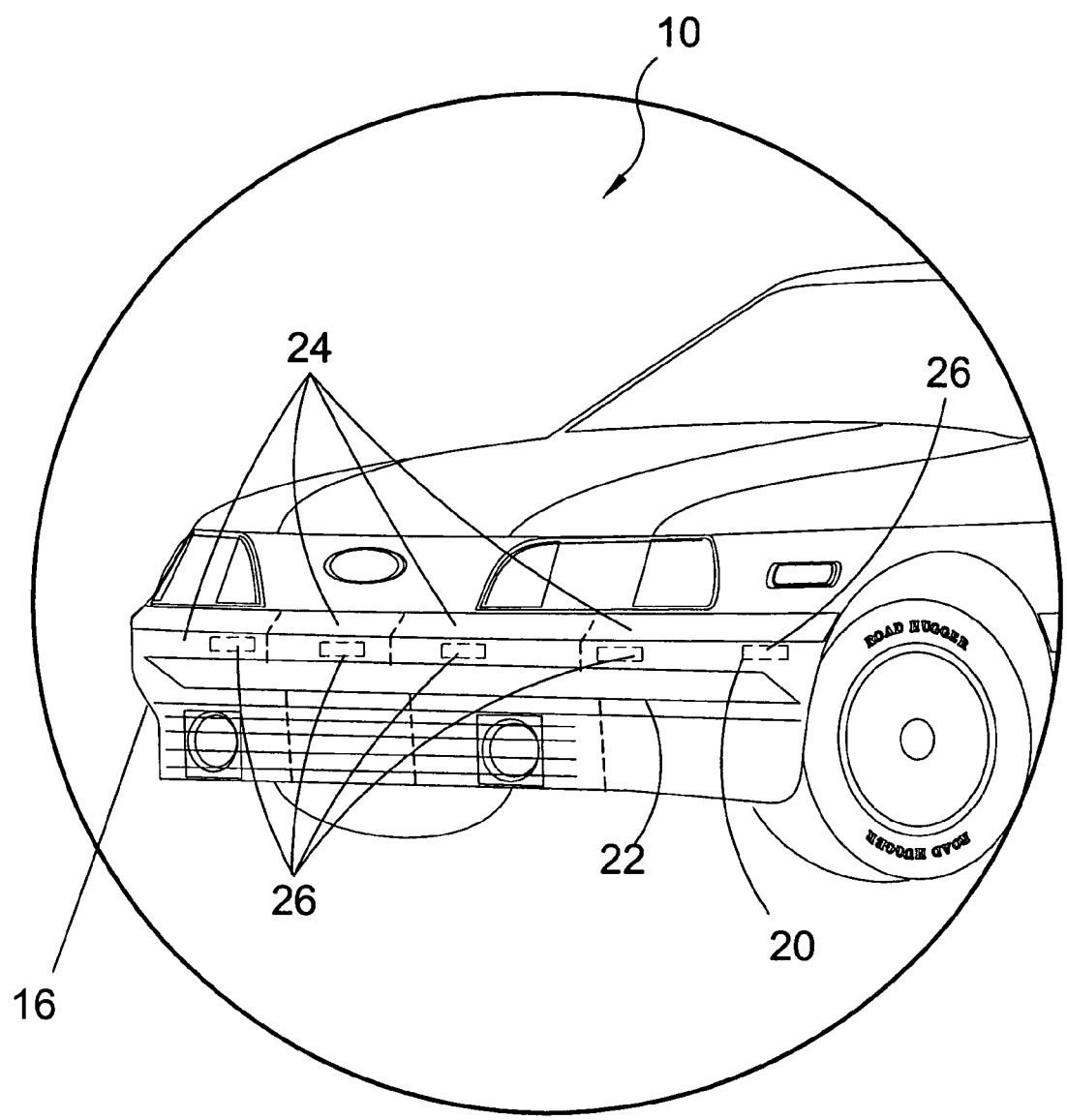
FIG. 2 is an illustrative view of the present invention.

FIG. 2 is an illustrative view of the present invention 10. Shown is the present invention 10 an air bag system for front vehicle bumpers 10 comprising an air bag compartment 22, housing a plurality of air bags 20, integrally incorporated within a vehicle bumper 16 having pressure sensors 26 communication with gas cartridges 30. Shown are the air bags 20 within the airbag compartment 22 positioned in the ideal location in order to perform the function required. Also shown is the interrelation between the pressure sensors 26, the break away panels 24 as well as the bumper 16 as they relate to the airbags 20 within the air bag compartment 22 and the overall vehicle 12.

Figure 3:
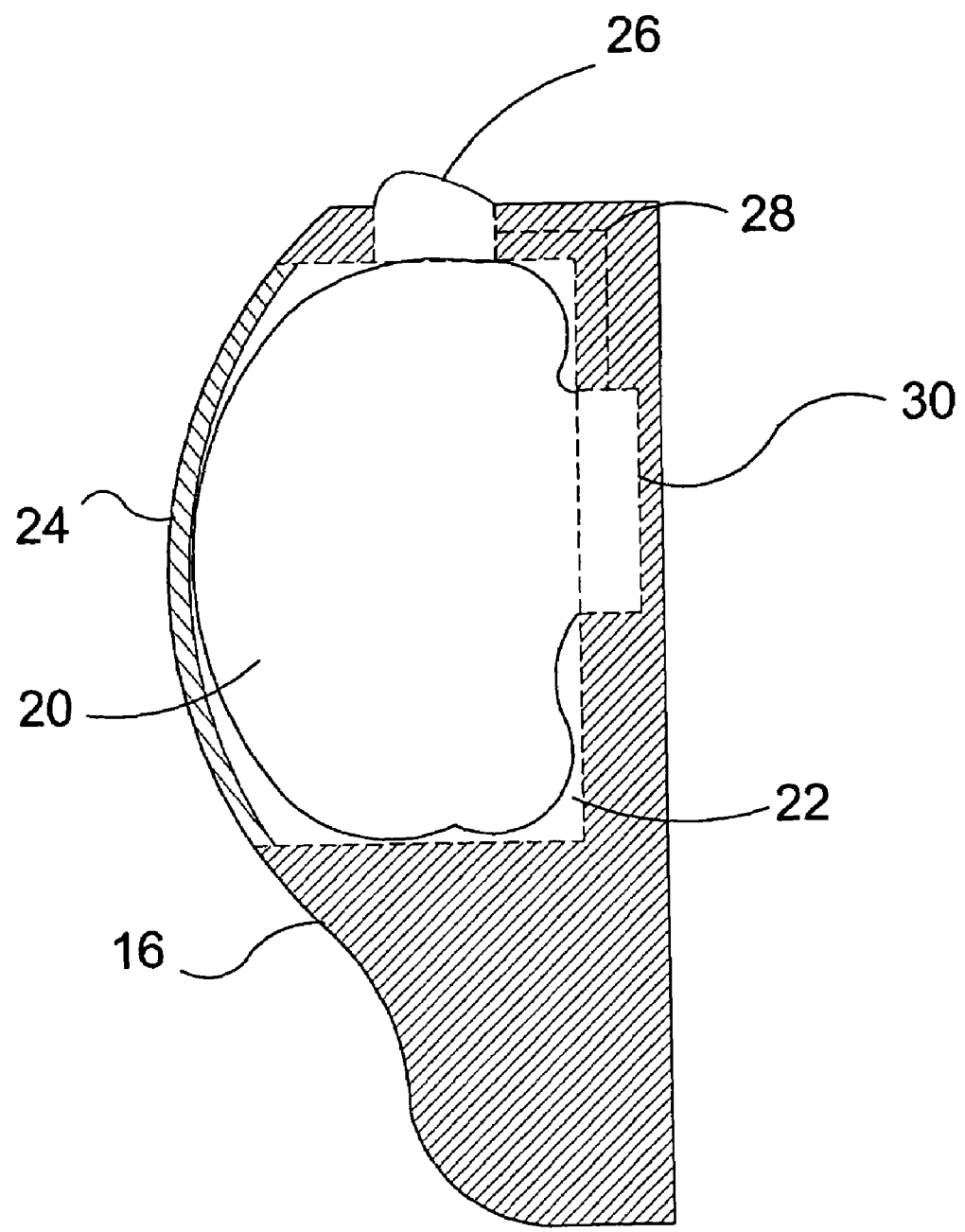
FIG. 3 is a side sectional view of the present invention.

FIG. 3 is a side sectional view of the present invention 10. Shown is a side sectional view of the present invention 10 an air bag system for front vehicle's bumpers 16. Shown is the correlation of parts that comprise said invention.

Figure 4:
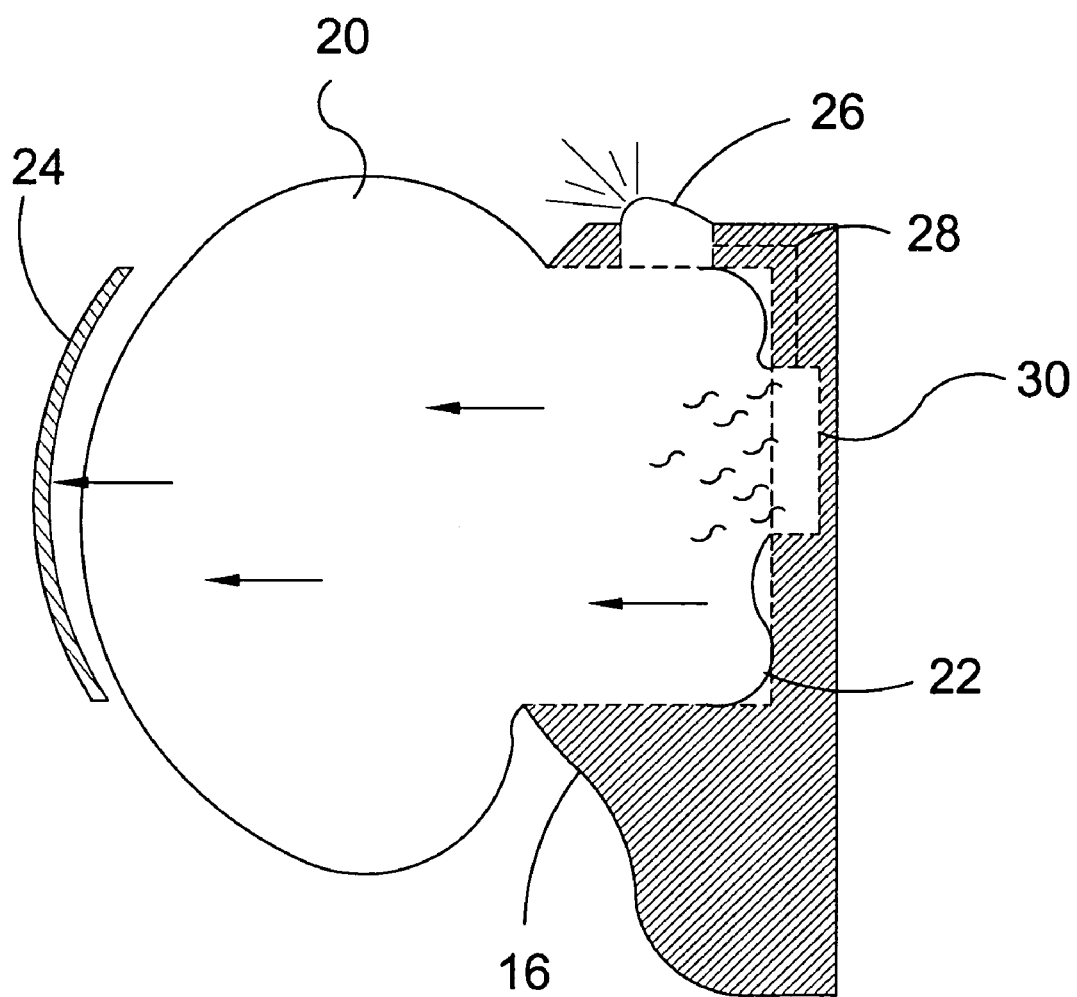
FIG. 4 is a side sectional view of the present invention activated.

FIG. 4 is a side sectional view of the present invention 10 activated. Shown is a side sectional view of the present invention 10 with air bag system for front vehicle bumpers 16 activated. Also shown is the functioning relation of the pressure sensor 26 as it activates the gas cartridge 30, the gas cartridge 30 releases its pay load into the air bag 20 that dislodges the break away panel 24 thus performing as it was designed to.

Figure 5:
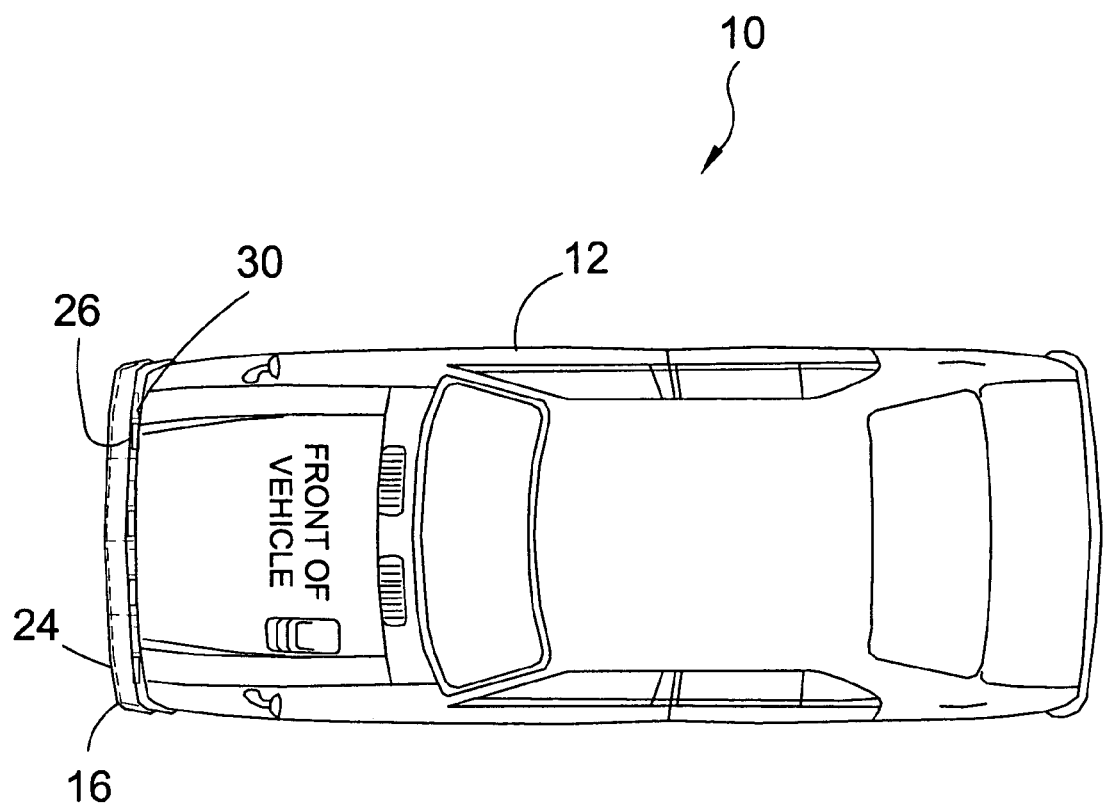
FIG. 5 is a top view of a vehicle equipped with the present invention.

FIG. 5 is a top view of a vehicle equipped with the present invention 10. Shown is a top view of a vehicle 12 equipped with the present invention 10. Shown are the locations of the pressure sensors 26 and gas cartridges 30 as they relate to the front and top of the vehicles 12 hood. Also shown is the linear displacement of the air bags and the break away panels 24 as they interrelate with the bumper 16 of the vehicle 12.

Figure 6:
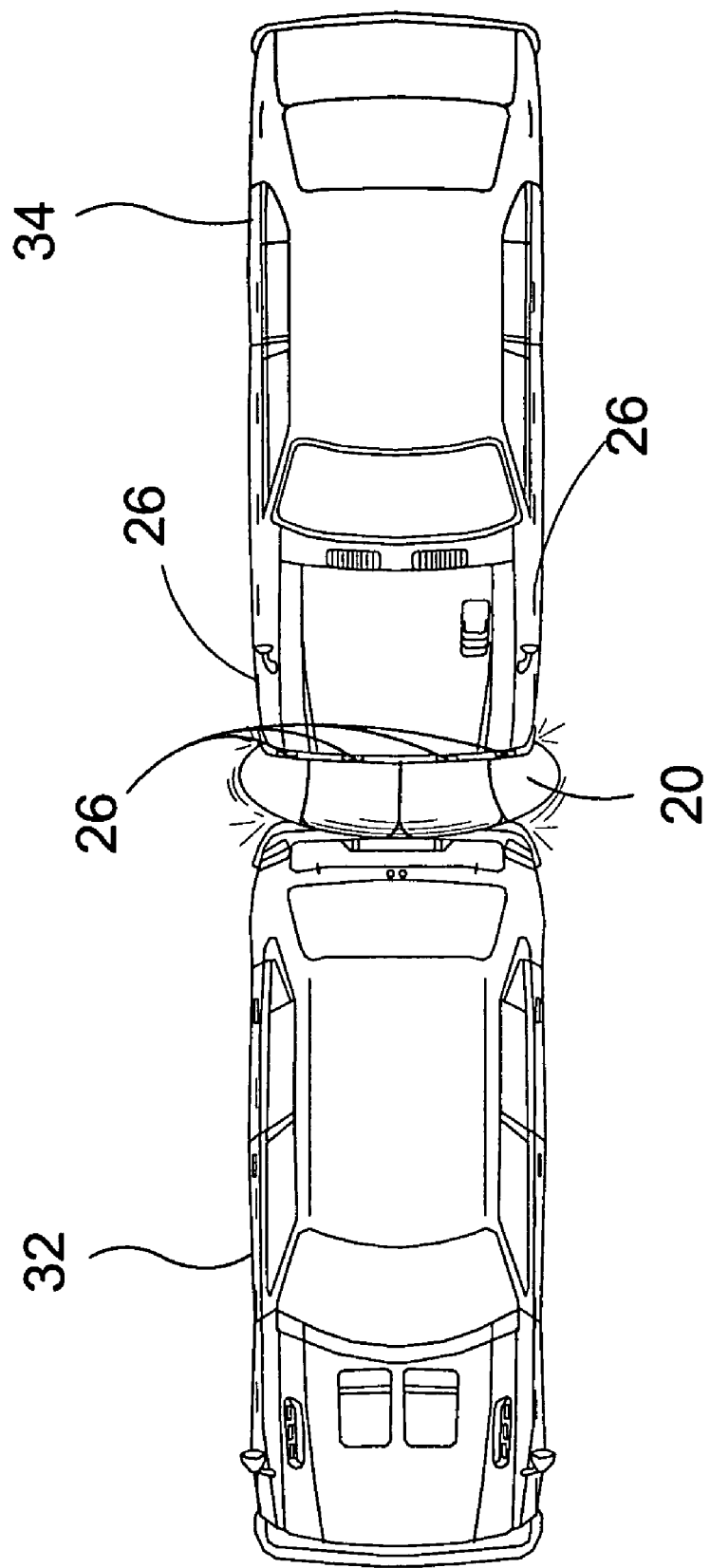
FIG. 6 is a top view of a vehicle equipped with the present invention involved in a collision.

FIG. 6 is a top view of two vehicles, with vehicle 2 34 equipped with the present invention 10. Shown is a rear-end collision where the velocity of the collision with vehicle 1 32 was enough to set off the front air bag system of vehicle 2 34. Also shown is the plurality of air bags 20 designed to absorb the impact of the various regions of the bumper. Further shown is the response of all of the pressure sensors 26 as they are to react in unisons with each other to deploy all air bags 20 for their intended purpose.

Figure 7:
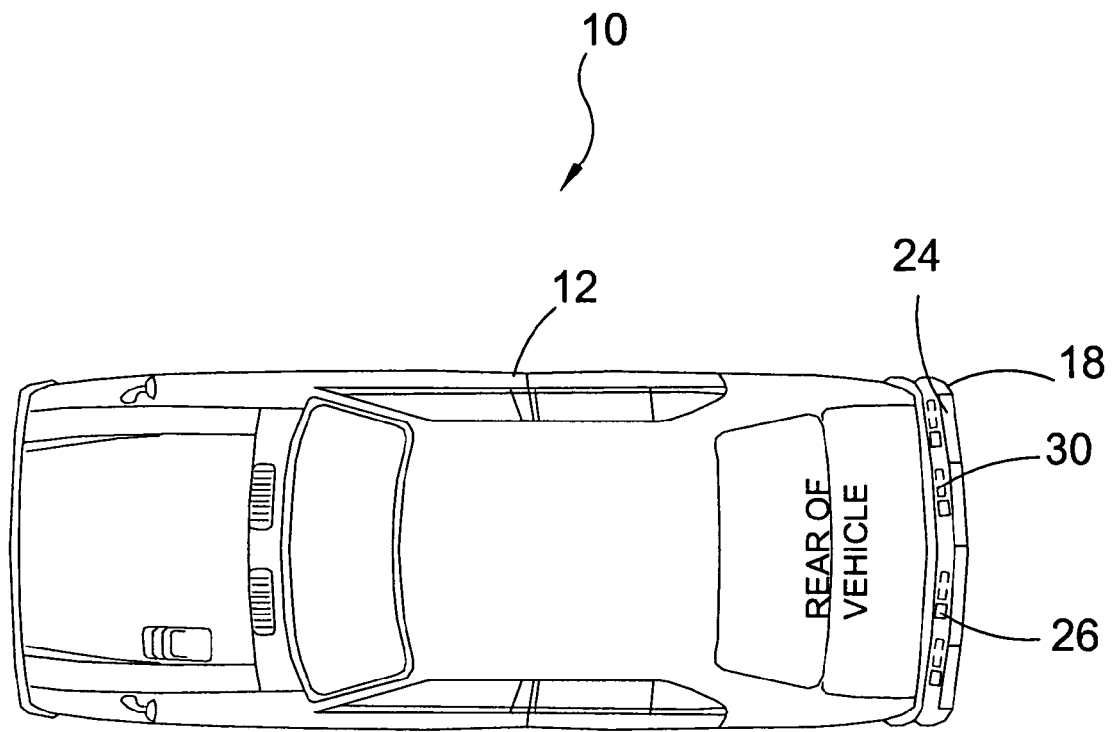
FIG. 7 is a top view of the present invention incorporated within a vehicle's rear bumper.

FIG. 7 is a top view of the present invention 10, incorporated within a vehicle's rear bumper 18. Shown is a top view of the present invention 10 an air bag system for rear vehicle bumpers. Shown is a similar set up for the rear bumper 18 of a vehicle 12 having the air bag system 10 incorporated therein. Also shown is the ideal setup of such a system to perform within its intended functionality.

Figure 8:
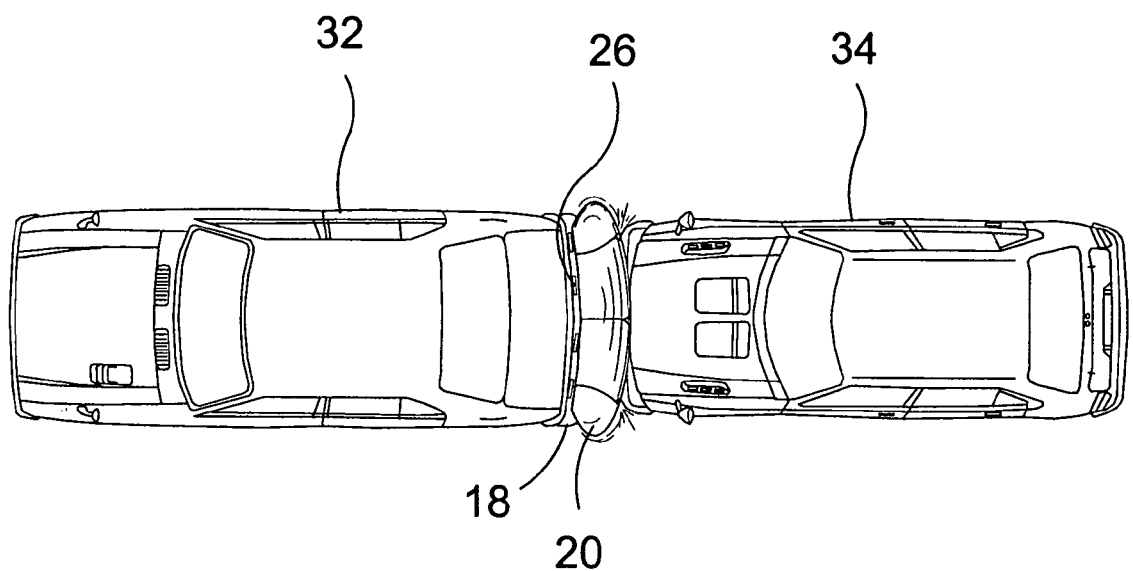
FIG. 8 is a top view of the present invention incorporated within a vehicle's rear bumper involved in a collision.

FIG. 8 is a top view of the present invention, incorporated within a vehicles rear bumper 18 involved in a collision. Shown is a top view of the present invention incorporated within s vehicle's rear bumper 18. Shown is the functioning relation of the pressure sensors 26 as they respond to a rear end collision from vehicle 2 34 and deploy the rear airbags 20 of vehicle 1 32. Also shown is the intended response of all of the airbags 20 as they react as a single unit to ensure that all areas of the rear of the vehicle are covered.

Figure 9:
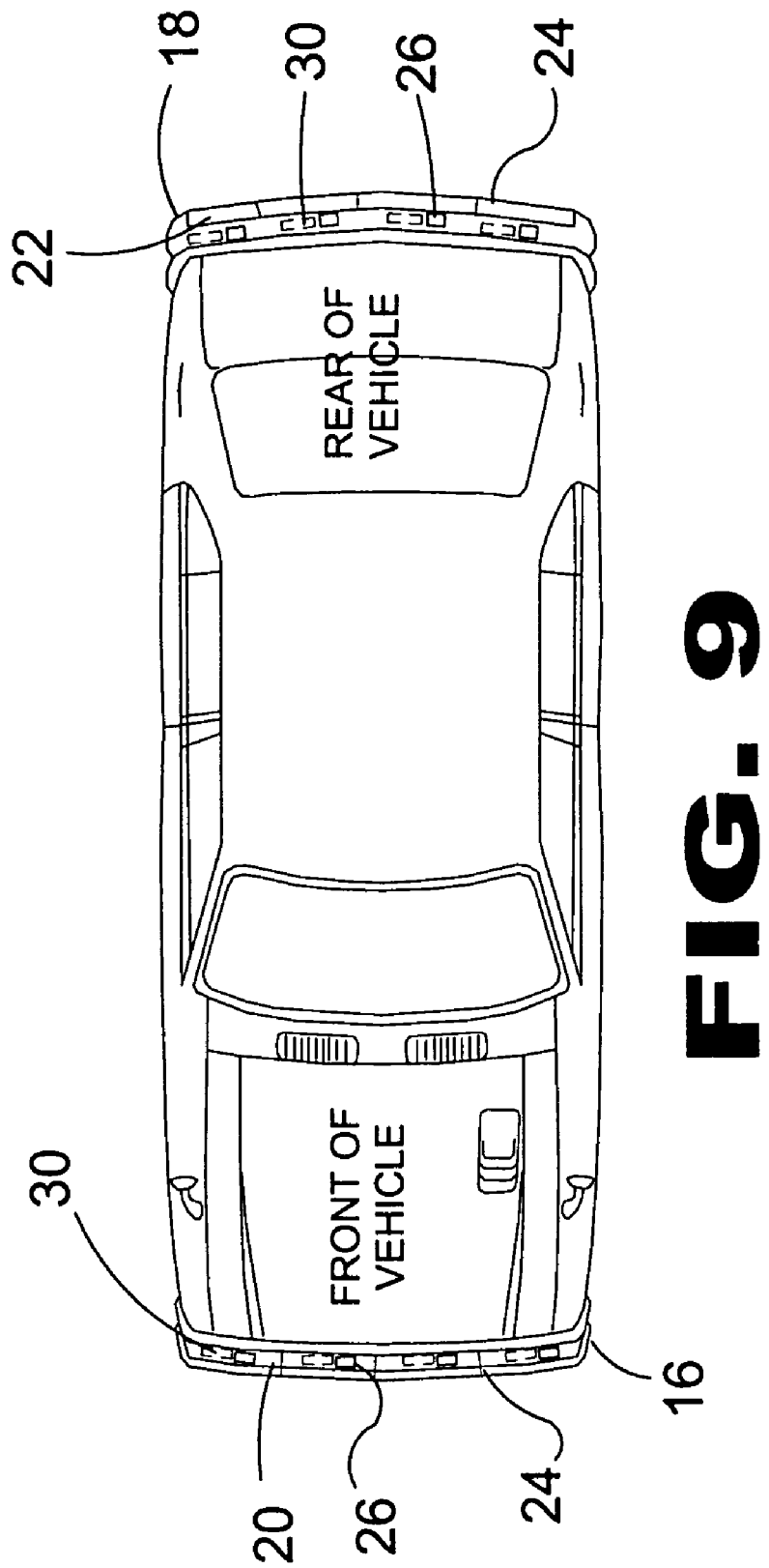
FIG. 9 is a top view of the present invention incorporated in a vehicle's front and rear bumper.

FIG. 9 is a top view of the present invention incorporated in vehicles 12 front 16 and rear bumpers 18. Shown is the present invention an air bag system for front and rear vehicle bumpers. Shown is a complete over view of the entire system as it is incorporated into a motor vehicle. Also shown is the typical arrangement, location and functioning positions of the components that comprise said invention. Further shown are a plurality of break away panels 24, air bags 20, gas cartridges 30 and pressure sensors 26 in both rear 18 and front bumper 16, each component is grouped with the other components to form integrated sections all designed to respond and react in a similar manner in order to have the intended and desired response of said invention.

Figure 10:
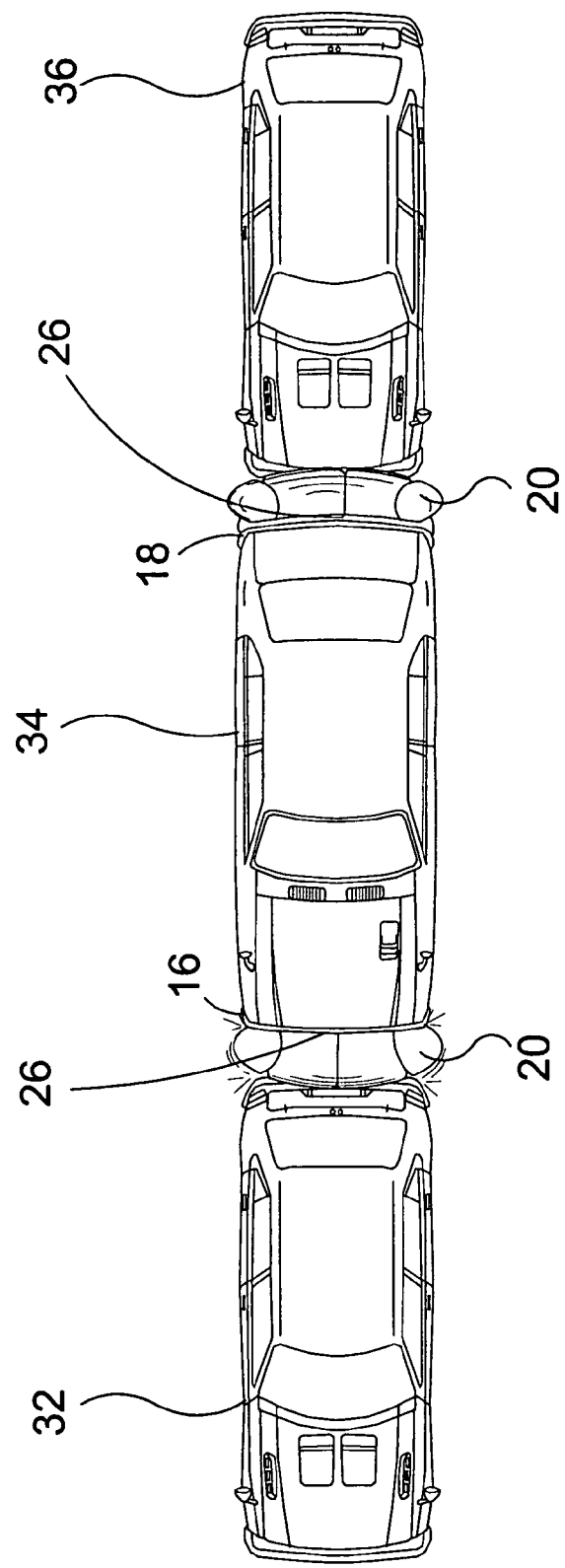
FIG. 10 is a top view of the present invention incorporated in a vehicle's front and rear bumper and involved in a collision.

FIG. 10 is a top view of the present invention incorporated in a vehicle's front 16 and rear 18 bumpers and involved in a collision with vehicle 1 32 in the front and vehicle 2 36 in the rear. Shown is the intended response of the present invention as it reacts to a multiple impact collision on both of the vehicles bumpers on vehicle 2 34. Also shown are all of the airbags 20 responding in unison to the impact thus shielding the operator of the vehicle from impending harm and injury.

Figure 11:
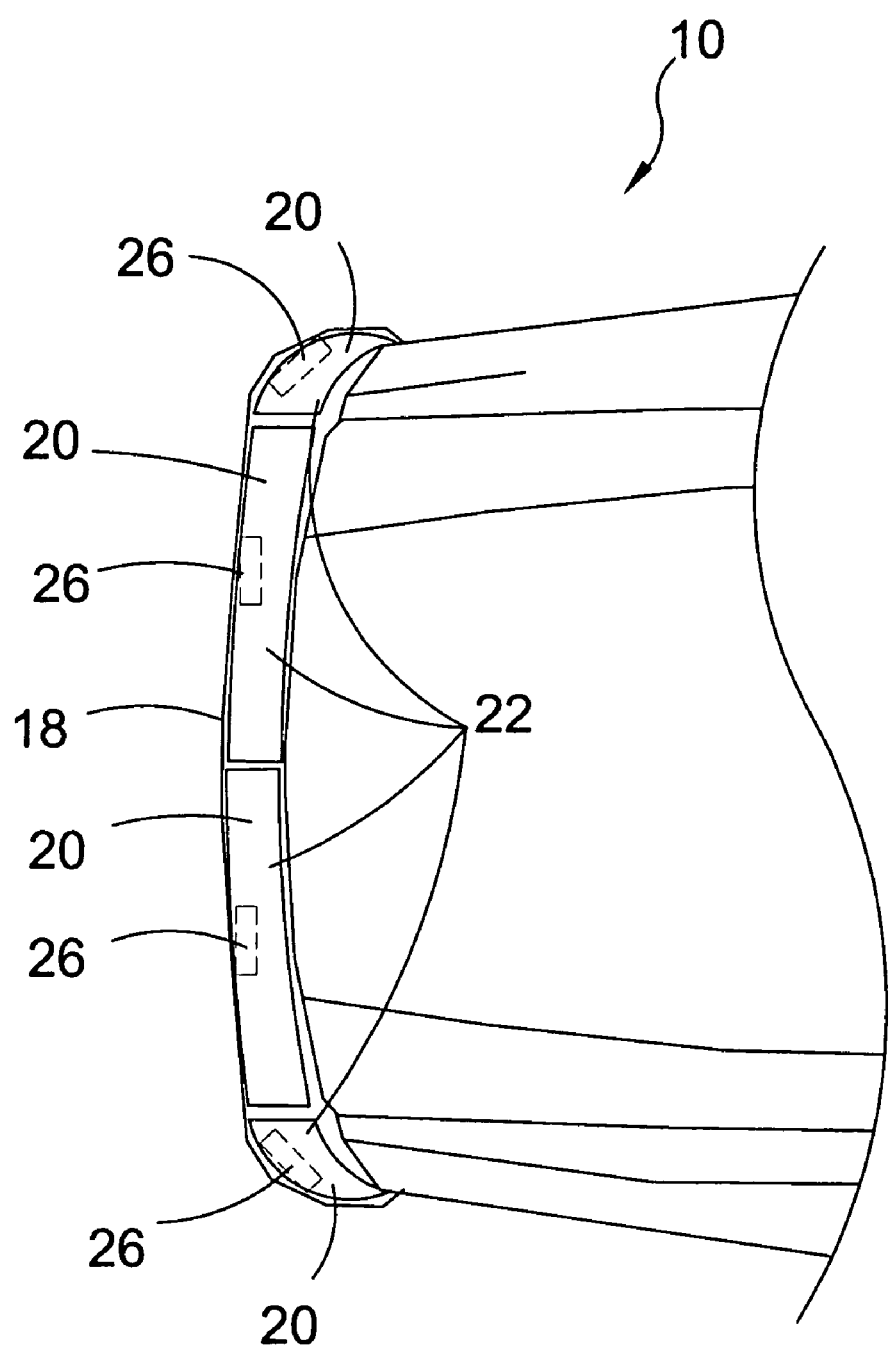
FIG. 11 is detail view of the present invention comprising a plurality of bumper air bags.

FIG. 11 is a detailed view of the present invention 10 comprising a plurality of bumper air bags 20. Shown is the present invention an air bag system for rear of vehicle's bumpers comprising of a plurality of air bag compartments 22, each housing a single air bag 20, integrally incorporated within a vehicle's bumper 18 having pressure sensors 26 in communication with gas cartridges.

Figure 12:
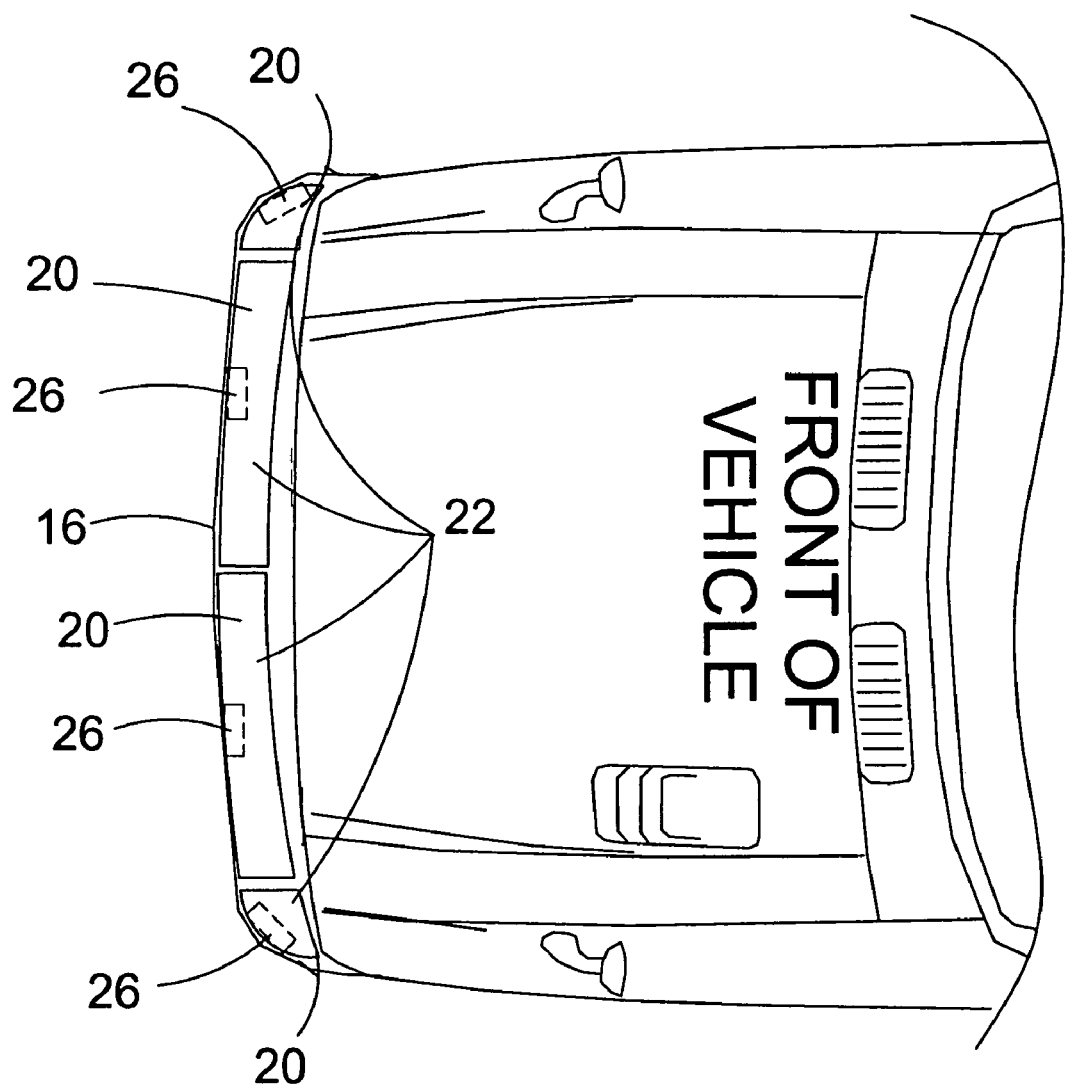
FIG. 12 is a detail view of the present invention comprising a plurality of bumper air bags.

FIG. 12 is a detailed view of the present invention comprising a plurality of bumper air bags 20. Shown is the present invention an air bag system for front of vehicle bumpers 16 comprising of a plurality of air bag compartments 22, each housing a single air bag 20, integrally incorporated within a vehicles bumper 16 having pressure sensors 26 in communication with gas cartridges.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various application without omitting features that, from the standpoint of prior art, fairly constitute essential characteristics of the generic or specific aspects of this invention.

What is claimed is new and desired to be protected by letters patent is set forth in the appended claims:

1. An air bag system incorporated into a motor vehicle bumper comprising:
   a) a bumper on a motor vehicle, said bumper having a rear surface, a front surface, a top surface, and a bottom surface, said front surface having a convex outer portion adjacent said top surface, said convex outer portion curving downwardly to a reduced thickness of said bumper in a lower portion thereof;
   b) at least one compartment integral with said bumper located behind said convex outer portion;
   c) an air bag disposed within said compartment;
   d) a breakaway panel in said bumper corresponding with said air bag compartment, said breakaway panel formed in a leading edge of said convex outer portion;
   e) a gas cartridge for said air bag to provide inflation means when deployment is required, said gas cartridge being located directly behind said air bag;
   f) a pressure sensor disposed in the upper surface of said bumper directly above said air bag to determine when deployment of said air bag is required; and
   g) a sensor signal communicating between said pressure sensor and said gas cartridge to initiate deployment of said air bag upon impact detected by said pressure sensor.

2. An air bag system incorporated into a motor vehicle bumper as recited in claim 1, wherein the bumper contains four air bags, two in the front and one on each corner, each air bag having a breakaway panel, a sensor and a gas cartridge.

3. An air bag system incorporated into a motor vehicle bumper as recited in claim 2, wherein each said pressure sensor detects impact on said bumper.

4. An air bag system incorporated into a motor vehicle built into a motor vehicle bumper as recited in claim 3, wherein a sensor signal activates all gas cartridges in said bumper whereby all air bags in the bumper are deployed upon impact of the bumper.

5. An air bag system incorporated into a motor vehicle built into a motor vehicle bumper as recited in claim 4, wherein each air bag knocks out a breakaway panel upon inflation and exits said bumper compartment.

6. An air bag system incorporated into a motor vehicle built into a motor vehicle bumper as recited in claim 5, wherein both front and rear bumpers contain said air bags.

* * * * *